US012651379B2

(12) United States Patent
Niebles et al.

(10) Patent No.: US 12,651,379 B2
(45) Date of Patent: Jun. 9, 2026

(54) SYSTEMS AND METHODS FOR PRIVACY-PRESERVING OPTICS

(71) Applicants: The Board of Trustees of the Leland Stanford Junior University, Stanford, CA (US); Universidad Industrial de Santander, Bucaramanga (CO)

(72) Inventors: Juan Carlos Niebles, Stanford, CA (US); Carlos Hinojosa, Thwal (CO); Henry Arguello, Bucaramanga (CO)

(73) Assignees: The Board of Trustees of the Leland Stanford Junior University, Stanford, CA (US); Universidad Industrial de Santander, Bucaramanga (CO)

( * ) Notice: Subject to any disclaimer, the term of this patent is extended or adjusted under 35 U.S.C. 154(b) by 269 days.

(21) Appl. No.: 18/571,592

(22) PCT Filed: Jun. 17, 2022

(86) PCT No.: PCT/US2022/073014
§ 371 (c)(1),
(2) Date: Dec. 18, 2023

(87) PCT Pub. No.: WO2022/266670
PCT Pub. Date: Dec. 22, 2022

(65) Prior Publication Data
US 2024/0289990 A1 Aug. 29, 2024

Related U.S. Application Data

(60) Provisional application No. 63/212,528, filed on Jun. 18, 2021.

(51) Int. Cl.
| | |
|---|---|
| *G06T 7/00* | (2017.01) |
| *G06T 7/73* | (2017.01) |
| *H04N 23/80* | (2023.01) |

(52) U.S. Cl.
CPC .................. *G06T 7/97* (2017.01); *G06T 7/75* (2017.01); *H04N 23/80* (2023.01); *G06T 2207/20084* (2013.01); *G06T 2207/30196* (2013.01)

(58) Field of Classification Search
CPC ... G06T 7/97; G06T 7/75; G06T 2207/20084; G06T 2207/30196; G06T 7/70;
(Continued)

(56) References Cited

U.S. PATENT DOCUMENTS

| | | |
|---|---|---|
| 10,535,120 B2 | 1/2020 | Edwards et al. |
| 11,562,244 B2 | 1/2023 | Wang et al. |

(Continued)

FOREIGN PATENT DOCUMENTS

| | | |
|---|---|---|
| WO | 2017141102 A1 | 8/2017 |
| WO | 2022266670 A1 | 12/2022 |

OTHER PUBLICATIONS

International Preliminary Report on Patentability for International Application No. PCT/US2022/073014, Report issued Dec. 14, 2023, Mailed on Dec. 28, 2023, 4 pgs.
(Continued)

*Primary Examiner* — Stephen P Coleman
(74) *Attorney, Agent, or Firm* — KPPB LLP

(57) ABSTRACT

Systems and methods for privacy-preserving optics are described. An embodiments includes a method of preserving-privacy on captured images while performing a computer vision task that includes generating an optimal set of parameters to parameterize an encoding optical element to produce optical distortions such that acquired images by the camera are distorted, where the optimal set of parameters is learned via end-to-end learning that jointly optimizes from a camera optics model to a computational process that performs a computer vision task on the distorted images (Continued)

acquired by the camera, where the distorted images visually obscure a privacy attribute of people to protect their privacy but still preserve features to perform the computer vision task, acquiring several distorted images, and performing a computer vision task directly on the distorted images where the distortions generated by the camera are optimal and allow obtaining high performance on the computer vision task.

20 Claims, 5 Drawing Sheets

(58) Field of Classification Search
CPC ...... H04N 23/80; H04N 23/611; H04N 23/95; G06V 10/82; G06V 10/88; G06V 40/23
USPC ......................................................... 382/103
See application file for complete search history.

(56) References Cited

U.S. PATENT DOCUMENTS

| | | |
|---|---|---|
| 2018/0137389 A1 | 5/2018 | Mathieu et al. |
| 2020/0143079 A1* | 5/2020 | Sohn ................... G06F 21/6245 |
| 2021/0076966 A1 | 3/2021 | Grantcharov et al. |
| 2021/0209388 A1 | 7/2021 | Ciftci et al. |
| 2022/0059132 A1 | 2/2022 | Sun et al. |
| 2022/0066544 A1 | 3/2022 | Kwon et al. |
| 2023/0083724 A1 | 3/2023 | Cella et al. |
| 2024/0021018 A1 | 1/2024 | Niebles et al. |
| 2024/0412491 A1 | 12/2024 | Sah et al. |

OTHER PUBLICATIONS

International Search Report and Written Opinion for International Application No. PCT/US2022/073014, Search completed Aug. 23, 2022, Mailed Sep. 6, 2022, 17 pgs.
Agrawal et al., "Person De-Identification in Videos", IEEE Transactions on Circuits and Systems for Video Technology, vol. 21, No. 3, Mar. 2011, pp. 299-310, doi: 10.1109/TCSVT.2011.2105551.
Ahmad et al., "Human Action Recognition Using Convolutional Neural Network and Depth Sensor Data", Proceedings of the International Conference on Information Technology and Computer Communications, Aug. 16, 2019, 5 pgs., doi: 10.1145/3355402.3355419.
Bommasani et al., "On the Opportunities and Risks of Foundation Models" arXiv:2108.07258, Jul. 12, 2022, 214 pgs.
Boominathan et al., "PhlatCam: Designed Phase-Mask Based Thin Lensless Camera", IEEE Transactions on Pattern Analysis and Machine Intelligence, vol. 42, No. 7, Jul. 2020, pp. 1618-1629, doi: 10.1109/TPAMI.2020.2987489.
Brkic et al., "I Know That Person: Generative Full Body and Face De-Identification of People in Images", IEEE Conference on Computer Vision and Pattern Recognition Workshops, Jul. 21-26, 2017, pp. 1319-1328, doi: 10.1109/CVPRW.2017.173.
Cao et al., "OpenPose: Realtime Multi-Person 2D Pose Estimation using Part Affinity Fields", IEEE Transactions on Pattern Analysis and Machine Intelligence, vol. 43, No. 1, 2021, 14 pgs., doi: 10.1109/TPAMI.2019.2929257.
Chang et al., "Hybrid optical-electronic convolutional neural networks with optimized diffractive optics for image classification", Scientific Reports, Nature, vol. 8, Aug. 17, 2018, 10 pgs., doi: 10.1038/s41598-018-30619-y.
Chen et al., "Real-time human action recognition based on depth motion maps", Journal of Real-Time Image Processing, vol. 12, Aug. 11, 2013, pp. 155-163, doi: 10.1007/s11554-013-0370-1.
Chen et al., "Tools for Protecting the Privacy of Specific Individuals in Video", EURASIP Journal on Advances in Signal Processing, vol. 2007, Article 75427, Dec. 1, 2007, 9 pgs., doi:10.1155/2007/75427.

Chollet, "Xception: Deep Learning with Depthwise Separable Convolutions", IEEE Conference on Computer Vision and Pattern Recognition, 2017, pp. 1800-1807, doi: 10.1109/CVPR.2017.195.
Deng et al., "ArcFace: Additive Angular Margin Loss for Deep Face Recognition", IEEE/CVF Conference on Computer Vision and Pattern Recognition, Jun. 15-20, 2019, pp. 4685-4694, doi: 10.1109/CVPR.2019.00482.
Dong et al., "Deep Wiener Deconvolution: Wiener Meets Deep Learning for Image Deblurring", Proceedings of the 34th International Conference on Neural Information Processing Systems, vol. 33, Article 89, Dec. 6, 2020, pp. 1048-1059, doi: 10.5555/3495724.3495813.
Dwibedi et al., "Counting Out Time: Class Agnostic Video Repetition Counting in the Wild", IEEE/CVF Conference on Computer Vision and Pattern Recognition, Jun. 13-19, 2020, pp. 10384-10393, doi: 10.1109/CVPR42600.2020.01040.
Fan et al., "RubiksNet: Learnable 3D-Shift for Efficient Video Action Recognition", Computer Vision—ECCV 2020, Lecture Notes in Computer Science, Springer, vol. 12364, Nov. 13, 2020, pp. 505-521, doi: 10.1007/978-3-030-58529-7_30.
Feichtenhofer et al., "Spatiotemporal Residual Networks for Video Action Recognition", Proceedings of the 30th International Conference on Neural Information Processing Systems, Dec. 5, 2016, pp. 3476-3484.
Guo et al., "MS-Celeb-1M: A Dataset and Benchmark for Large-Scale Face Recognition", Computer Vision—ECCV 2016, Lecture Notes in Computer Science, Springer, vol. 9907, Sep. 17, 2016, pp. 87-102, doi: 10.1007/978-3-319-46487-9_6.
He et al., "Deep Residual Learning for Image Recognition", IEEE Conference on Computer Vision and Pattern Recognition (CVPR), Las Vegas, NV, USA, 2016, pp. 770-778, doi: 10.1109/CVPR.2016.90.
He et al., "Imbalanced Learning Foundations, Algorithms, and Applications", Wiley-IEEE Press, 2013, 216 pgs.
Hinojosa et al., "Learning Privacy-preserving Optics for Human Pose Estimation", IEEE/CVF International Conference on Computer Vision, Oct. 10-17, 2021, pp. 2553-2562, doi: 10.1109/ICCV48922.2021.00257.
Hore et al., "Image quality metrics: PSNR vs. SSIM", 20th International Conference on Pattern Recognition, Aug. 23-26, 2010, pp. 2366-2369, doi: 10.1109/ICPR.2010.579.
Huang et al., "Learning to Align from Scratch", Proceedings of the 26th International Conference on Neural Information Processing Systems, vol. 1, Dec. 3, 2012, pp. 764-772.
Ji et al., "Skeleton embedded motion body partition for human action recognition using depth sequences", Signal Processing, vol. 143, Feb. 2018, pp. 56-68, doi: 10.1016/j.sigpro.2017.08.016.
Junejo et al., "View-Independent Action Recognition from Temporal Self-Similarities", IEEE Transactions on Pattern Analysis and Machine Intelligence, vol. 33, No. 1, Jan. 2011, pp. 172-185, doi: 10.1109/TPAMI.2010.68.
Karpathy et al., "Large-scale Video Classification with Convolutional Neural Networks", IEEE Conference on Computer Vision and Pattern Recognition, Jun. 23-28, 2014, pp. 1725-1732, doi: 10.1109/CVPR.2014.223.
Kopuklu et al., "Resource Efficient 3D Convolutional Neural Networks", IEEE/CVF International Conference on Computer Vision Workshop, Oct. 27-28, 2019, pp. 1910-1919, doi: 10.1109/ICCVW.2019.00240.
Krishna et al., "Visual Intelligence through Human Interaction", Human-Computer Interaction Series, Nov. 5, 2021, pp. 257-314, doi: 10.1007/978-3-030-82681-9_9.
Kuehne et al., "HMDB: A Large Video Database for Human Motion Recognition", International Conference on Computer Vision, Nov. 6-13, 2011, pp. 2556-2563, doi: 10.1109/ICCV.2011.6126543.
Kupyn et al., "DeblurGAN-v2: Deblurring (Orders-of-Magnitude) Faster and Better", IEEE/CVF International Conference on Computer Vision, 2019, pp. 8877-8886, doi: 10.1109/ICCV.2019.00897.
Lakshrninarnyanan et al., "Zernike polynomials: a guide", Journal of Modern Optics, vol. 58, No. 7, Apr. 10, 2011, pp. 545-561, doi: 10.1080/09500340.2011.554896.

(56) References Cited

OTHER PUBLICATIONS

Liu et al., "Spatiotemporal Relationship Reasoning for Pedestrian Intent Prediction", IEEE Robotics and Automation Letters, vol. 5, No. 2, Apr. 2020, pp. 3485-3492, doi: 10.1109/LRA.2020.2976305.

Marquez et al., "Compressive spectral imaging via deformable mirror and colored-mosaic detector", Optics Express vol. 27, No. 13, Jun. 24, 2019, pp. 17795-17808, doi: 10.1364/OE.27.017795.

Marquez et al., "Snapshot compressive spectral depth imaging from coded aberrations", Optics Express vol. 29, No. 6, Mar. 15, 2021, pp. 8142-8159, doi: 10.1364/OE.415664.

Metzler et al., "Deep Optics for Single-shot High-dynamic-range Imaging", IEEE/CVF Conference on Computer Vision and Pattern Recognition, Jun. 13-19, 2020, pp. 1372-1382, doi: 10.1109/CVPR42600.2020.00145.

Moschoglou et al., "AgeDB: the first manually collected, in-the-wild age database", IEEE Conference on Computer Vision and Pattern Recognition Workshops, Jul. 21-26, 2017, pp. 1997-2005, doi: 10.1109/CVPRW.2017.250.

Orekondy et al., "Towards a Visual Privacy Advisor: Understanding and Predicting Privacy Risks in Images", 2017 IEEE International Conference on Computer Vision (ICCV), Oct. 22-29, 2017, pp. 3706-3715, doi: 10.1109/ICCV.2017.398.

Padilla-Lopez et al., "Visual privacy protection methods: A survey", Expert Systems with Applications, vol. 42, No. 9, Jun. 1, 2015, pp. 4177-4195, doi: 10.1016/j.eswa.2015.01.041.

Panagiotakis et al., "Unsupervised Detection of Periodic Segments in Videos", 25th IEEE International Conference on Image Processing, Oct. 7-10, 2018, pp. 923-927, doi: 10.1109/ICIP.2018.8451336.

Pareek et al., "A survey on video-based Human Action Recognition: recent updates, datasets, challenges, and applications", Artificial Intelligence Review, vol. 54, No. 3, 2021, pp. 2259-2322, doi: 10.1007/s10462-020-09904-8.

Pittaluga et al., "Learning Privacy Preserving Encodings Through Adversarial Training", IEEE Winter Conference on Applications of Computer Vision, Jan. 7-11, 2019, pp. 791-799, doi: 10.1109/WACV.2019.00089.

Pittaluga et al., "Pre-Capture Privacy for Small Vision Sensors", IEEE Transactions on Pattern Analysis and Machine Intelligence, vol. 39, No. 11, Dec. 8, 2016, pp. 2215-2226, doi: 10.1109/TPAMI.2016.2637354.

Pittaluga et al., "Privacy Preserving Optics for Miniature Vision Sensors", IEEE Conference on Computer Vision and Pattern Recognition, Jun. 7-12, 2015, pp. 314-324, doi: 10.1109/CVPR.2015.7298628.

Purwanto et al., "Extreme Low Resolution Action Recognition with Spatial-Temporal Multi-Head Self-Attention and Knowledge Distillation", IEEE/CVF International Conference on Computer Vision Workshop, Oct. 27-28, 2019, pp. 961-969, doi: 10.1109/ICCVW.2019.00125.

Ren et al., "Learning to Anonymize Faces for Privacy Preserving Action Detection", Computer Vision—ECCV 2018, Lecture Notes in Computer Science, Springer, vol. 11205, Oct. 6, 2018, pp. 639-655, doi: 10.1007/978-3-030-01246-5_38.

Ryoo et al., "Extreme Low Resolution Activity Recognition with Multi-Siamese Embedding Learning", The Thirty-Second AAAI Conference on Artificial Intelligence, Article 896, Feb. 2, 2018, pp. 7315-7322.

Ryoo et al., "Privacy-Preserving Human Activity Recognition from Extreme Low Resolution", Proceedings of the Thirty-First AAAI Conference on Artificial Intelligence, Feb. 4, 2017, pp. 4255-4262, doi: 10.1609/aaai.v3111.11233.

Sandler et al., "MobileNetV2: Inverted Residuals and Linear Bottlenecks", IEEE/CVF Conference on Computer Vision and Pattern Recognition, 2018, pp. 4510-4520, doi: 10.1109/CVPR.2018.00474.

Sengupta et al., "Frontal to Profile Face Verification in the Wild", IEEE Winter Conference on Applications of Computer Vision, Mar. 7-16, 2016, 9 pgs., doi: 10.1109/WACV.2016.7477558.

Sitzmann et al., "End-to-end Optimization of Optics and Image Processing for Achromatic Extended Depth of Field and Super-resolution Imaging", ACM Transactions on Graphics, vol. 37, No. 4, Aug. 2018, pp. 114:1-114:13, doi: 10.1145/3197517.3201333.

Sun et al., "Exploring Sparseness and Self-Similarity for Action Recognition", IEEE Transactions on Image Processing, vol. 24, No. 8, Aug. 2015, pp. 2488-2501, doi: 10.1109/TIP.2015.2424316.

Szegedy et al., "Going Deeper with Convolutions", IEEE Conference on Computer Vision and Pattern Recognition, 2015, 9 pgs., doi: 10.1109/CVPR.2015.7298594.

Szegedy et al., "Rethinking the Inception Architecture for Computer Vision", IEEE Conference on Computer Vision and Pattern Recognition, Jun. 27-30, 2016, pp. 2818-2826, doi: 10.1109/CVPR.2016.308.

Tan et al., "MnasNet: Platform-Aware Neural Architecture Search for Mobile", IEEE/CVF Conference on Computer Vision and Pattern Recognition, Jun. 15- 20, 2019, pp. 2815-2823, doi: 10.1109/CVPR.2019.00293.

Tran et al., "Learning Spatiotemporal Features With 3d Convolutional Networks", Proceedings of the IEEE International Conference on Computer Vision, 2015, pp. 4489-4497, doi: 10.1109/ICCV.2015.510.

Tran et al., "Video Classification with Channel-Separated Convolutional Networks", IEEE/CVF International Conference on Computer Vision, 2019, pp. 5551-5560, doi: 10.1109/ICCV.2019.00565.

Upton, "Fisher's Exact Test", Journal of the Royal Statistical Society. Series A (Statistics in Society), vol. 155, No. 3, May 1992, pp. 395-402, doi: 10.2307/2982890.

Van Der Maaten et al., "Dimensionality Reduction: A Comparative Review", Journal of Machine Learning Research, vol. 10, pp. 66-71.

Wang et al., "Image Quality Assessment: From Error Visibility to Structural Similarity", IEEE Transactions on Image Processing, vol. 13, No. 4, Apr. 2004, pp. 600-612, doi: 10.1109/TIP.2003.819861.

Wang et al., "Privacy-Preserving Action Recognition Using Coded Aperture Videos", IEEE/CVF Conference on Computer Vision and Pattern Recognition Workshops, 2019, 10 pgs., doi: 10.1109/CVPRW.2019.00007.

Wang et al., "Temporal Segment Networks: Towards Good Practices for Deep Action Recognition", Computer Vision—ECCV 2016, Lecture Notes in Computer Science, Springer, vol. 9912, Sep. 17, 2016, pp. 20-36, doi: 10.1007/978-3-319-46484-8_2.

Wu et al., "Privacy-Preserving Deep Action Recognition: An Adversarial Learning Framework and A New Dataset", IEEE Transactions on Pattern Analysis and Machine Intelligence, vol. 44, No. 4, Sep. 28, 2020, pp. 2126-2139, doi: 10.1109/TPAMI.2020.3026709.

Wu et al., "Towards Privacy-Preserving Visual Recognition via Adversarial Training: A Pilot Study", Computer Vision—ECCV 2018. ECCV 2018. Lecture Notes in Computer Science Springer, vol. 11220, Oct. 6, 2018, pp. 627-645, doi: 10.1007/978-3-030-01270-0_37.

Zagoruyko et al., "Wide Residual Networks", arXiv:1605.07146v4, Jun. 14, 2017, 15 pgs.

* cited by examiner

SYSTEMS AND METHODS FOR PRIVACY-PRESERVING OPTICS

CROSS REFERENCE TO RELATED APPLICATIONS

This application is a national stage of PCT Application Serial Number PCT/US2022/073014, entitled "Systems and Methods for Privacy-Preserving Optics" by Niebles et al., filed Jun. 17, 2022, which claims benefit of and priority under 35 U.S.C. 119(e) to U.S. Provisional Application Ser. No. 63/212,528, entitled "Systems and Methods for Privacy Preserving Optical Systems" by Niebles et al., filed Jun. 18, 2021, the disclosures of which are herein incorporated by reference in their entireties.

FIELD OF THE INVENTION

The present invention generally relates to the design and implementation of optimized optics for performing a machine vision task while preserving privacy on captured images.

BACKGROUND

Cameras are optical devices that capture visual images. The majority of cameras use one or more lenses to focus light on a light-sensitive surface. Digital cameras use optical sensors as the light-sensitive surface in contrast to photo-sensitive film. Digital cameras capture images as image data. While there are many different ways to encode image data, a common way is as a grid of pixels, where each pixel records intensity values. A time-series of images can be viewed (and encoded) as video data.

Computer vision is a scientific field concerned with understanding how computers can gain understanding from image and video data. Computer vision is a broad field, and includes (non-exhaustively) scene reconstruction, object detection, event detection, video tracking, object recognition, pose estimation, motion estimation, visual serving, and many other applications.

SUMMARY OF THE INVENTION

Systems and method in accordance with embodiments of the invention capture images while preserving-privacy attributes and perform a computer vision task on the captured images. One embodiment includes a system, that includes: a camera including an encoding optical element, at least one lens and a focal plane array (FPA) detector; at least one processor; memory that includes an image processing pipeline application; where the image processing pipeline application directs the at least one processor to: generate an optimal set of parameters to parametrize the encoding optical element in the camera to produce optical distortions such that acquired images by the camera are distorted, where the optimal set of parameters is learned via end-to-end learning that jointly optimizes from a camera optics model to a computational process that performs a computer vision task on the distorted images acquired by the camera, where the distorted images visually obscure a privacy attribute of people to protect their privacy but still preserve features to perform the computer vision task; acquire several distorted images using the camera; perform the computer vision task directly on the distorted images where the distortions generated by the camera are optimal and allow obtaining high performance on the computer vision task.

In a further embodiment, the image processing pipeline application includes a deep neural network (DNN), where the DNN is trained to detect several features directly on the distorted images, and where the DNN includes several layers for detecting the several features based on several nodes that perform a calculation on degraded input image data.

In a further embodiment, the encoding optical element includes an ensemble of optical elements that generate image distortion via light modulation.

In a further embodiment, the distortion produced by the encoding optical element is optimal for a specific computer vision task and allows obtaining high performance.

In a further embodiment, the functionality of the camera, including the encoding optical element, is emulated in software to generate synthetic degraded images.

In a further embodiment, the camera model is coupled with the image processing pipeline software to emulate the system.

In a further embodiment, the set of parameters for the encoding optical element add optical aberrations to the camera.

In a further embodiment the distorted images obscure at least one privacy-preserving human attribute selected from a group consisting of, for example, facial features, gender, race, and age.

In a further embodiment, the distorted images are robust to blind and non-blind deconvolution attacks.

In a further embodiment, performing a computer vision task includes performing human pose estimation (HPE) on the distorted images.

In a further embodiment, the image processing pipeline application includes a computer vision decoder that has been jointly trained to generate the set of parameters of the camera encoding optical element $\alpha*$ and a convolutional neural network fo human r pose estimation h* such that:

$$\alpha*, h *= \mathrm{argmin}_{\alpha,h} L_T(h) + L_P(\alpha)$$

where $L_T$ is a loss function for the human pose estimation task, and $L_P$ is a loss function that encourages privacy-preservation.

In a further embodiment, the set of parameters of the camera encoding optical element includes a lens surface profile $\phi$, in terms of Zernike coefficients $\alpha$, and a corresponding point spread function (PSF) H for the camera lens.

In a further embodiment, the set of parameters parametrize a lens surface profile $\phi$ with the Zernike basis, such that:

$$\phi = \sum_{j=1}^{q} \alpha_j Z_j,$$

where $Z_j$ is the j-th Zernike polynomial in Noll notation, and $\alpha_j$ is the corresponding coefficient, wherein each Zernike polynomial describes a wavefront aberration such that the surface profile $\phi$ is formed by a linear combination of all aberrations.

In a further embodiment, the computer vision decoder is a convolutional neural network (CNN) decoder that is trained using a backbone network and several branches of convolutional layers, where the backbone network extracts features from an image of size w×h, which are then fed into the several branches convolutional layers, where a first branch predicts a set of confidence maps, where each map represents a specific body part location, and a second branch predicts a set of Part Affinity Fields (PAFs), where each field represents the degree of association between parts.

In a further embodiment, the optical encoder and the computer vision decoder share a loss function; and the optical encoder and computer vision decoder are configured to jointly optimize the privacy-preserving optical system and a computer vision model.

Another embodiment includes a method of preserving-privacy on captured images while performing a computer vision task, including generating an optimal set of parameters to parameterize an encoding optical element of a camera to produce optical distortions such that acquired images by the camera are distorted, where the optimal set of parameters is learned via end-to-end learning that jointly optimizes from a camera optics model to a computational process that performs a computer vision task on the distorted images acquired by the camera, where the distorted images visually obscure a privacy attribute of people to protect their privacy but still preserve features to perform the computer vision task; acquiring several distorted images using the camera; performing a computer vision task directly on the distorted images where the distortions generated by the camera are optimal and allow obtaining high performance on the computer vision task.

In a further embodiment, the method further includes using a deep neural network (DNN), where the DNN is trained to detect several features directly on the distorted images, and where the DNN includes several layers for detecting the several features based on several nodes that perform a calculation on degraded input image data.

In a further embodiment, encoding optical element includes an ensemble of optical elements that generate image distortion via light modulation.

In a further embodiment, the distortion produced by the encoding optical element is optimal for a specific computer vision task and allows obtaining high performance.

In a further embodiment, the computer vision task is a human pose estimation (HPE) task on the distorted images.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Privacy is a significant concern for many consumers, however more consumer products are including cameras in order to provide functionality that is in fact desired by consumers. By way of example, a video gaming system may include one or more cameras (e.g. the Microsoft Kinect) that is functionally an internet connected camera always pointed at a consumer's living room. Further, augmented reality glasses, security cameras, home automation cameras, medical patient monitoring cameras, and many more devices produce similar concerns. As can be readily appreciated given the ubiquity of cameras, there are many instances where privacy should be incentivized. While these cameras might not have nefarious intent, there is no guarantee that they could not be coopted by bad actors. Therefore, it is desirable to in fact degrade the capabilities of these cameras so they cannot capture quality images of private spaces, but also to maintain functionality which has traditionally required relatively high fidelity images. Systems and methods described herein are capable of generating privacy-preserving optics that produce images that are difficult for humans to interpret visually, and also difficult for computers to deblur or otherwise enhance.

Deep optics is the concept of building an end-to-end optimization of a computational camera such that the optics and the computer vision algorithms are optimized for each other to achieve higher resolution and higher fidelity in the image while simultaneously improving the performance of the algorithm. Systems and methods described herein utilize a "reverse" deep optics approach, where the goal is not to improve image quality, but in fact to obscure information in the image. In many embodiments, a specialized lens or lens stack can be generated in concert with a computer vision model which achieves the goal of a conventional computer vision model in concert with a conventional lens, but produces and operates on images that preserve the privacy of individuals in the images. For example, in many embodiments, a pose estimation computer visional model can be generated to be used with a specifically generated optic, where the optic produces blurry images that cannot be processed to show the faces of individuals in the image, but still produces valid, high accuracy pose estimation when processed. As can be readily appreciated, this is not limited to pose estimation, but the computer vision model can be swapped out for any computer vision application as appropriate to the requirements of specific applications of embodiments of the invention, with a similarly appropriate custom optic.

Figure 1:
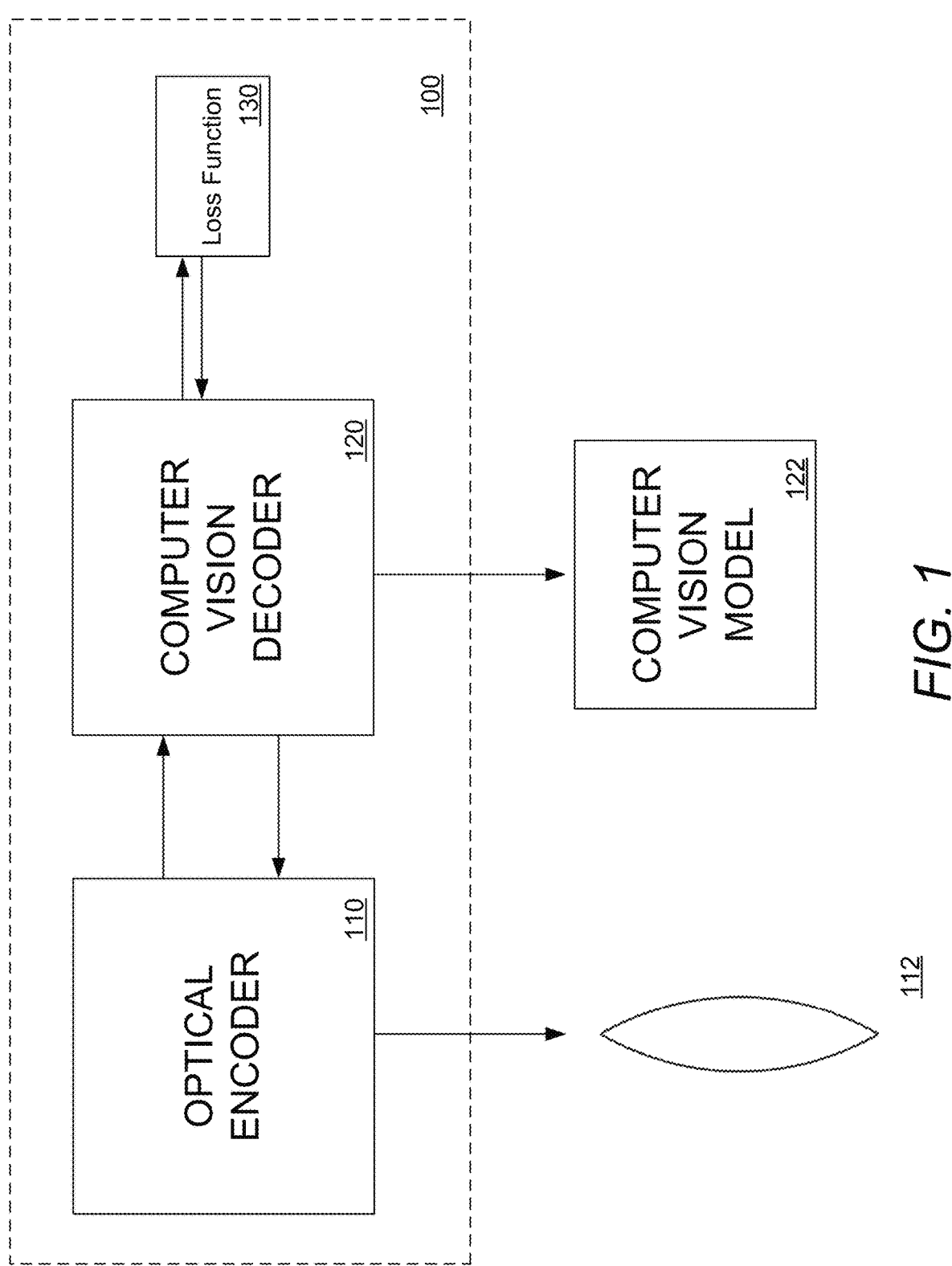
FIG. 1 conceptually illustrates a system for generating a privacy preserving optic and computer vision model in accordance with an embodiment of the invention.

Turning now to FIG. 1, a system for generating a privacy preserving optic and computer vision model in accordance with an embodiment of the invention is illustrated. Generation system 100 includes an optical encoder 110, a computer vision decoder 120, and a loss function 130. In many embodiments, the optical encoder is a machine learning system which generates simulated images from labeled training data as passed through a model of a lens. In various embodiments, the optical encoder can include a convex thin lens and a refractive/diffractive optical element (freeform lens) add-on. In contrast to the traditional lens design approach, the parametrization of the freeform lens can be learned during training such that aberrations are added instead of removing them. Then, the optical encoder can generate privacy-preserving images from labeled training data as passed through the lens model. In many embodiments, the computer vision decoder is a machine learning system which attempts to perform a specific computer vision task on images provided by the optical encoder. A loss function can be designed to be privacy preserving and rewards privacy-related attributes such as, but not limited to, face clarity, race, gender, age, and/or any other privacy-related attribute as appropriate to the requirements of specific applications of embodiments of the invention. In many embodiments, accuracy of the computer vision model is also rewarded. In various embodiments, the optical encoder and computer vision decoder attempt to obtain the highest accuracy in the computer vision model while incrementing the image distortion as much as possible. Both the optical encoder and the computer vision decoder can be updated via back-propagation. Specific embodiments of system 100 are discussed in further detail below.

Figure 2:
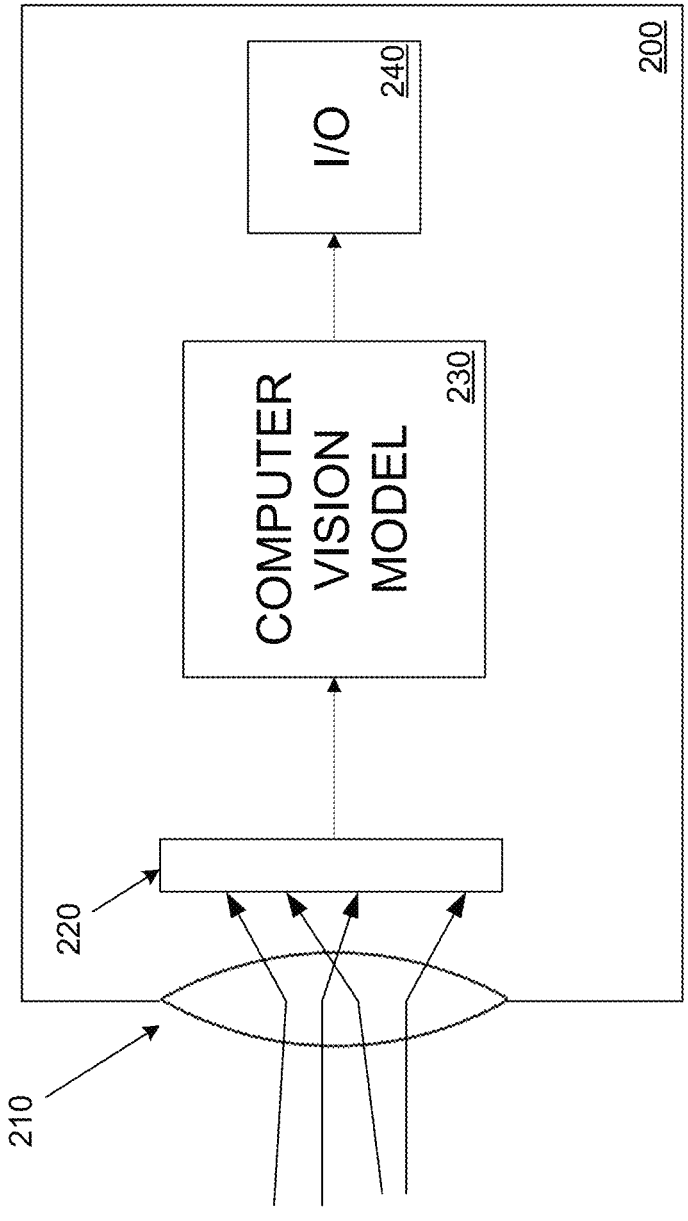
FIG. 2 is a block diagram illustrating a camera using a privacy generating optic and a computer vision model in accordance with an embodiment of the invention.

In many embodiments, output of optical encoder 110 is an optic design 112. Similarly, the output of the computer vision decoder 120 is a computer vision model 122. The optic design and computer vision model can be designed to operate with each other in a complete system. Turning now to FIG. 2, a camera utilizing an optic design and computer vision model produced as discussed above is illustrated. Camera 200 includes a privacy-preserving optic 210. Privacy preserving optic 210 may function "poorly" as a lens. That is, it may not preserve high fidelity images as commonly understood, and may be highly irregular. It should be understood that the standard convex lens illustrated in the instant figures is illustrative only, and is not representative of any specific optic design. Light passes through the privacy-preserving optic and strikes image sensor 220. The image sensor passes image data to the computer vision model 230 which has been generated in concert with the privacy preserving optic. The computer vision model produces an output which is passed to an input/output (I/O) interface for use in other parts of the system and/or in other systems.

As can be readily appreciated, while one lens is shown in the above, any number of lens can be generated for use in a privacy-preserving lens stack. Further, it is important to note that conventional cameras with conventional optics can be made into privacy-preserving camera systems by replacing the optical encoder with a firmware encoder which, when embedded into the image sensor, can manipulate the image sensor's output to directly produce a privacy-preserving image. However, given that the privacy preservation occurs at the sensor level rather than the optic level, there is a possibility of an additional vulnerability if the device were able to be accessed by a bad actor.

Many embodiments provide for a camera that can directly obviate sensitive data while still obtaining useful information for a given task. In many embodiments, the entire system, including the camera's optical elements and image processing algorithms parameters can be optimized in an end-to-end fashion, enabling the design of domain-specific computational cameras. The end-to-end optimization of domain-specific computational cameras has been known as Deep Optics, which aims to improve the optical elements to acquire high-resolution/high-fidelity images and simultaneously improve the performance of computer vision algorithms. Many embodiments of the system can extend this philosophy to design privacy-preserving optical systems.

Many embodiments provide for a privacy-preserving computational camera via end-to-end optimization to capture useful information to perceive humans in the scene while hiding privacy-sensitive information. Since many computer vision applications need to analyze humans as the first step in their frameworks, the system can jointly optimize a freeform lens (e.g., the spatially varying surface height of a lens, among various other attributes) together with a human pose estimation (HPE) network to develop a privacy-preserving HPE system. Accordingly, the system can provide a privacy-preserving end-to-end optimization framework to extract useful information from a scene yet preventing the imaging system from obtaining detailed and privacy-sensitive visual data. The system can use an end-to-end optimization framework to optimize an optical encoder (e.g., Hardware-level protection) with a software decoder (e.g., convolutional neural net) to add a visual privacy protection layer to HPE. The optical elements of the camera lens can be jointly optimized and the backbone of a HPE network can be fine-tuned. In many embodiments, it may not be necessary to retrain the HPE network layers to achieve privacy preservation. Many embodiments can perform extensive simulations on a dataset (e.g., the COCO dataset) to validate the privacy-preserving deep optics approach for HPE.

In many embodiments, the optical system lens can be designed to degrade the image quality and obscure sensitive private information, which can be opposite from the traditional approach of improving the imaging quality. The system can add a visual privacy protection layer to an already trained HPE network using the designed optics and fine-tune the backbone layers. There can be a trade-off between the attained scene degradation and the HPE precision.

Privacy-Preserving Pose Estimation

Many embodiments of the system provide for privacy-preserving human pose estimation and/or other machine vision applications. In certain embodiments, the system can optimize the camera optics and the human pose estimation network jointly to achieve privacy protection via image degradation.

Figure 3A:
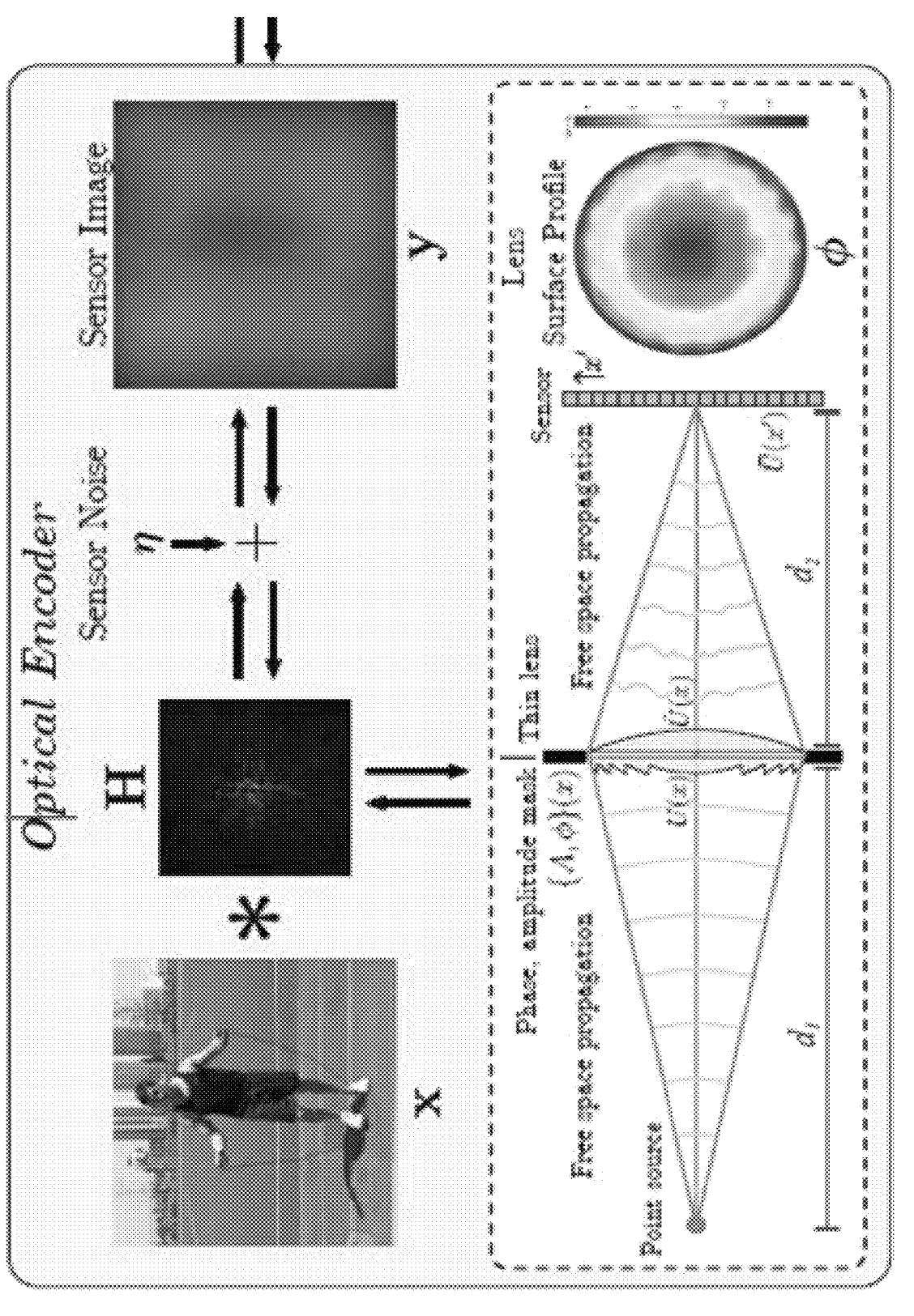
FIG. 3A and FIG. 3B conceptually illustrates an end-end framework for privacy-preserving optics for machine vision.
Figure 3B:
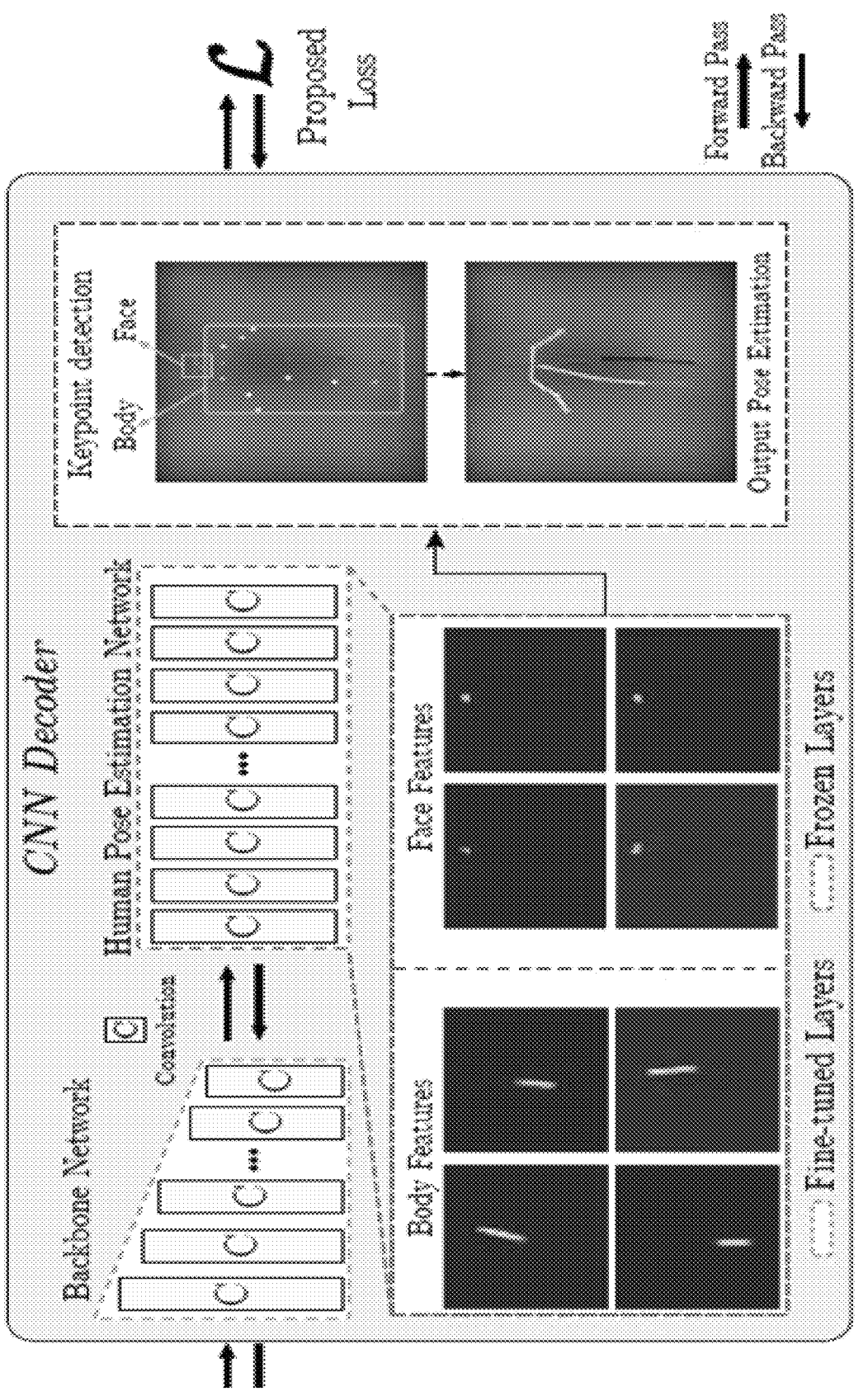

To preserve privacy, many embodiments of the system modify a camera lens to degrade an image in such a way that the identity of the subjects is obscured while preserving important features for pose estimation. An end-to-end framework of a system for privacy-preserving pose estimation in accordance with an embodiments is conceptually illustrated in FIG. 3A and FIG. 3B. In particular, the system can include two components, an Optical Encoder as illustrated in FIG. 3A and a Convolutional Neural Network (CNN) Decoder as illustrated in FIG. 3B in accordance with an embodiment of the invention. The Optical Encoder module can be parametrized appropriately to allow for learning of the camera lens. The CNN Decoder can perform the task of human pose estimation and/or other machine vision operations on an optically degraded image.

In many embodiments, during training, the Optical Encoder module and the CNN Decoder can be jointly optimized to provide for the privacy-preserving pose estimation system. In many embodiments, the result of the training process is two-fold: the camera lens parameters $\alpha^*$ and the convolutional network for pose estimation $h^*$. To achieve this, a loss function can be formulated for learning that combines the two goals as provided by equation (1) below:

$$\alpha*, h* = \arg \min_{\alpha, h} L_T(h) + L_P(\alpha). \qquad (1)$$

where $L_T$ is the loss function for the pose estimation task, and $L_P$ is a loss function that encourages privacy-preservation. During inference, the system can be deployed in hardware by constructing a camera lens using the optimal parameters $\alpha^*$ that acquires degraded images on which the network $h^*$ can perform pose estimation. Certain embodiments of the system can be deployed as a software-only solution and can implement the image degradation post-acquisition.

Optical Encoder

An Optical Encoder module as illustrated in FIG. 3A in accordance with an embodiment of the invention can be responsible for the image acquisition process in a privacy-preserving human pose estimation (HPE) system. In many embodiments of the system can modify the optical system of the camera during training to provide for privacy-preservation. Accordingly, the system can produce images that visually obscure the identity of the person but still preserve important features for pose estimation. Many embodiments of the system achieve this by adopting deep optics, and use end-to-end training to jointly optimize the camera optics and the HPE network.

In many embodiments, the camera optics can be optimized by adding optical aberrations directly on the surface of the lens (e.g., a freeform lens among various other types of lenses) instead of removing them. Many embodiments may not perform image reconstruction and instead work directly with acquired low-quality images.

Many embodiments of the system can appropriately parametrize the camera lens to enable end-to-end learning and to perform back-propagation. A training signal to optimize the camera optics can back-propagate from the privacy-preserving loss $L_P(\alpha)$.

In several embodiments of the system, there are several parts to the parametrization: the lens surface profile $\phi$, which can be in terms of Zernike coefficients $\alpha$, and the corresponding point spread function (PSF) H for the camera lens. Described below are further details regarding the relationship between $\phi$ and H by the image formation model in accordance with various embodiments of the invention. Also described below are the parametrization of the lens surface profile $\phi$ in terms of coefficients $\alpha$ for the Zernike polynomials in accordance with various embodiments of the invention.

Image Formation Model

In many embodiments of the system, a wave-based image formation model for natural scenes can be derived to write the PSF H in terms of $\phi$, assuming spatially incoherent light. The light transport in the camera can be modeled using a differentiable Fourier optics model.

FIG. 3A illustrates an optical system in accordance with an embodiment of the invention. The optical system can include a convex thin lens with a custom refractive optical element add-on with surface profile $\phi$. Similar to a photographic filter, such an optical element can be mounted directly in front of the lens. The response of the camera system to a point light source can be described by the point spread function (PSF) created by the lens. The sensing process can be modeled as a 2D convolution operation between the scene and PSF as provided by equation (2) below:

$$y = g(H * x) + \eta, \qquad (2)$$

where $$x \in \mathbb{R}_+^{w \times h}$$

is the scene and it is represented as a discrete color image with w×h pixels, and each pixel has value in [0,1]; $\eta$ represents the Gaussian noise in the sensor, and g(•) is the camera response function, which can be assumed to be linear. In many embodiments, the PSF can be assumed to be shift-invariant, but the model could be generalized.

Assuming that the thin lens has a focal length f at a distance $d_2$ from the sensor, the relationship between the in-focus distance and the sensor distance in the paraxial ray approximation is given by the thin-lens equation: $1/f = 1/d_1 + 1/d_2$.

Therefore, an object at a distance $d_1$ in front of the lens appears in focus at a distance $d_2$ behind the lens. Assuming that the scene is at optical infinity, many embodiments can first propagate the light emitted by the point, represented as a spherical wave, to the lens. The complex-valued wave field immediately before the lens is given by equation (3) below:

$$U(x, y) = \exp\left(ik\sqrt{x^2 + y^2 + z^2}\right), \qquad (3)$$

where $k = 2\pi/\lambda$ is the wavenumber. The refractive optical element can first delay the phase of this incident wavefront by an amount proportional to the surface profile $\phi$ of the optical element at each point (x, y). Equivalently, the optical element may be represented by a multiplicative phase transformation of the form described by equation (4) below:

$$t_\phi(x, y) = \exp(ik(n(\lambda) - 1)\phi(x, y)), \qquad (4)$$

where $n(\lambda)$ is the wavelength-dependent refractive index of the optical element material.

The light wave continues to propagate to the camera lens, which induces the following phase transformation described by equation (5) below:

$$t_l(x, y) = \exp\left(-i\frac{k}{2f}(x^2 + y^2)\right) \qquad (5)$$

Considering that a lens has a finite aperture size, many embodiments of the system can use a binary circular mask A(x, y) with diameter D to model the aperture and block light in regions outside the open aperture. To find the electric field immediately after the lens, many embodiments of the system can multiply the amplitude and phase modulations of the refractive optical element and lens with the input electric field using equation (6) below:

$$\tilde{U}(x, y) = A(x, y)t_\phi t_l(x, y)U(x, y). \qquad (6)$$

Finally, the field propagates a distance $d_2$ to the sensor with the exact transfer function:

$$T_{d_2}(f_x, f_y) = \exp\left[ikd_2\sqrt{1 - (\lambda f_x)^2 - (\lambda f_y)^2}\right], \qquad (7)$$

where $(f_x, f_y)$ are spatial frequencies. This transfer function can be applied in the Fourier domain as:

$$\tilde{U}(x', y') = \mathcal{F}^{-1}\{\mathcal{F}\{\tilde{U}(x, y)\} \cdot T_{d_2}(f_x, f_y)\}, \qquad (8)$$

where $\mathcal{F}$ denotes the 2D Fourier transform. Since the sensor can measure light intensity, many embodiments of the system take the magnitude-squared to find the values of the PSF H at each position (x, y) as:

$$H(x', y') = |\bar{U}(x', y')|^2. \tag{9}$$

Lens Parametrization

Many embodiments of the system can parametrize a lens surface profile $\phi$ with the Zernike basis, which can lead to smoother surfaces, as provided by equation 10 below:

$$\phi = \sum_{j=1}^{q} \alpha_j Z_j, \tag{10}$$

where $Z_j$ is the j-th Zernike polynomial in Noll notation, and $\alpha_j$ is the corresponding coefficient. Each Zernike polynomial can describe a wavefront aberration; hence the surface profile $\phi$ can be formed by the linear combination of all aberrations. In this regard, the optical element parameterized by $\phi$ can be seen as an optical encoder, where the coefficients $\alpha_j$ determine the data transformation. Therefore, the end-to-end training in accordance with many embodiments of the system can find a set of coefficients $$\alpha^* = \{\alpha_j\}_{j=1}^{q}$$

that provides the maximum visual distortion of the scene but allows to extract relevant features to perform HPE. In many embodiments, different types of parameters and techniques can be used to determine wavefront abberations as appropriate to the requirements of specific applications in accordance with embodiments of the invention.

CNN Decoder

Many embodiments of the system can perform HPE using an available network architecture (e.g., OpenPose network architecture). The network (e.g., OpenPose network) in accordance with many embodiments of the system can be composed of a backbone (e.g., VGG-19 backbone), and have one or more branches of convolutional layers (e.g., two branches of convolutional layers). The backbone network can extract features from an image of size w×h, which can then be fed into the one or more branches. In certain embodiments, one branch can predict a set of confidence maps, where each map represents a specific body part location; a second branch can predict a set of Part Affinity Fields (PAFs), where each field represents the degree of association between parts. Successive stages can be performed to refine the predictions made by each branch. In many embodiments of the system, the confidence maps and the PAFs can be parsed by greedy inference to produce the 2D locations of body keypoints for each person in the image.

HPE Loss Function $L_T$

In many embodiments, the network (e.g., OpenPose) loss can account for both the body and face keypoints to improve human pose estimation in an image. Let $\mathcal{S} = \{S_1, S_2, \ldots, S_E\}$ be the set of confidence maps, where each map $S_e \in \mathbb{R}^{w \times h}$ represents a specific keypoint location, $e \in \{1, \ldots, E\}$. Similarly, let $V = \{V_1, V_2, \ldots, V_C\}$ be the set of PAFs, where each affinity field $V_c \in \mathbb{R}^{w \times h \times 2}$ represents the degree of association between the keypoints, and $c \in \{1, \ldots, C\}$. Certain embodiments of the system can split the confidence maps as $\mathcal{S} = \{\mathcal{S}_B, \mathcal{S}_F\}$, where $\mathcal{S}_B \downarrow \mathcal{S}$ includes the maps $S_e$ for the body keypoints, and $\mathcal{S}_F \subseteq S$ includes the maps $S_e$ for the face keypoint locations. Similarly, certain embodiments of the system can split the PAFs as $\mathcal{V} = \{\mathcal{V}_{B\ B}, \mathcal{V}_{F\ F}\}$, where $\mathcal{V}_{B\ B} \subseteq \mathcal{V}$ includes the affinity fields $V_c$ of the body limbs, and $\mathcal{V}_{F\ F} \subseteq \mathcal{V}$ includes the affinity fields $V_c$ that represent the degree of association between two face parts. Certain embodiments can define the loss function for a subset of keypoints $\chi$ at stage $\tau$ is $$F_\tau(\chi) = \sum_{\delta=1}^{|\chi|} \sum_p B(p) \cdot \|\chi_\delta^\tau(p) - \chi_\delta^*(p)\|_2^2 \tag{11}$$

where $|\chi|$ is the number of keypoints in the subset. For instance, if $\chi = \mathcal{S}_B$ then $|\chi|$ will be the total number of body-related confidence maps. B is a binary mask with $B(p)=0$ when the annotation is missing at the pixel p, and $$\chi_\delta^*$$

denotes the groundtruth. Then, the overall OpenPose $L_T$ is $$L_T = \sum_{\tau=1}^{\Gamma_1} F_\tau(V_B) + F_\tau(V_F) + \sum_{\tau=\Gamma_1+1}^{\Gamma_1+\Gamma_2} F_\tau(\mathcal{S}_B) + F_\tau(\mathcal{S}_F), \tag{12}$$

where $\Gamma_1$ and $\Gamma_2$ denote the total of PAF and confidence map stages, respectively. Although the above description provides a particular set of computations to determine an HPE Loss Function, any of a variety of computational techniques can be utilized as appropriate to the requirements of specific applications in accordance with embodiments of the invention.

Privacy-Preserving Loss Function $L_P$

In many embodiments, defining a privacy-preserving loss function can depend on concrete application contexts. There can be various privacy-related attributes, such as the face, race, gender, or age among various other attributes. In many embodiments of the system, the face can be the main attribute to obscure in a privacy-preserving vision task. Accordingly, certain embodiments of the system can define the privacy-preserving loss taking into account face keypoints detection in the images. In many embodiments, a user may not be interested in obtaining an accurate localization of face keypoints, and the system can obscure such face regions from the image. Accordingly, the system may preserve the body keypoints and let the end-to-end training degrade most if not all of the image's spatial details (e.g., including the faces). To further enforce image degradation, many embodiments of the system can maximize the $\ell_2$ norm error between the original image x and the acquired image y, defined as $$L_E = \sum_b \frac{1}{2} \|y_b - x_b\|_2^2, \tag{13}$$

where the subscript b denotes the color bands of the images (e.g., RGB images, among various other types of images in different color coordinates). In many embodi ments, the privacy-preserving loss function can be defined as provided in equation (14) below:

$$L_P = -\sum_{\tau=1}^{\Gamma_1} F_\tau(\mathcal{V}_F) - \sum_{\tau=\Gamma_1+1}^{\Gamma_1+\Gamma_2} F_\tau(\mathcal{S}_F) - \beta_2 L_E. \tag{14}$$

Considering Eq. 1, many embodiments of the system can compute the total loss at the end of the framework as follows in equation (15) below:

$$L = L_T + L_P = \beta_1\left(\sum_{\tau=1}^{\Gamma_1} F_\tau(\mathcal{V}_B) + \sum_{\tau=\Gamma_1+1}^{\Gamma_1+\Gamma_2} F_\tau(\mathcal{S}_B)\right) - \beta_2 L_E. \tag{15}$$

Although a particular set of computations are described for a privacy preserving loss function, any of a set of computations can be utilized for preserving privacy for different attributes, including race, gender, age among others as appropriate to the requirements of specific applications in accordance with embodiments of the invention. Training details for training a network in accordance with embodiments of the invention are described in detail below.

Training Details

Optics Layer Simulation

In certain embodiments, the system can include simulating a sensor with a particular pixel size (e.g., pixel size of 3.40 μm) and resolution (e.g., resolution of 864×864 pixels). The system can use the first Zernike coefficients in Noll notation (e.g., first Zernike coefficients q=350 Zernike coefficients in Noll notation) to shape the surface profile φ. The fourth Zernike coefficient (the defocus term) can be initialized, such that the lens has a particular focal length (e.g., focal length of f=25 mm). The optical element can be discretized with a particular feature size (e.g., 3.40 μm feature size) on a particular grid (e.g., 864×864 grid). Although a specific set of pixel size, resolution and Zernike coefficients are set forth above, any of a variety of pixel size, resolution and coefficients can be specified as appropriate to the requirements of specific applications in accordance with embodiments of the invention.

Fine-Tuning

Many embodiments of the system can add a privacy protection layer to a pre-trained network (e.g., OpenPose network). In certain embodiments, to perform training, the system can assume an aberration-free freeform lens and use pretrained weights of a particular network implementation (e.g., Tensorflow implementation of OpenPose) as a starting point. After initialization with the pre-trained weights, the system can freeze one or more branches (e.g., the two branches of OpenPose) and only fine-tune some layers of the backbone (e.g., VGG-19 backbone) with a lower learning rate to learn extracting human body features from the private image y. FIG. 3B illustrates the frozen and fine-tuned layers in accordance with an embodiment of the invention.

Training

In many embodiments, during training, the system can first perform one forward pass through the network by convolving the images from the training set with the PSF H to obtain the optically-encoded sensor image y, as described by Eq. 2. Next, the backbone (e.g., VGG-19 backbone) can extract features from y, and then the features are fed into the two branches of the architecture. Certain embodiments of the system can split the confidence maps $\mathcal{S}$ and PAFs V into body-related and face-related features as described, and compute the loss described in Eq. 15. In many embodiments, after computing L, the system can use the automatic differentiation capabilities to back-propagate the error and update the parameters of the backbone (e.g., VGG-19 backbone) and the coefficients $\alpha_j$ that model surface profile φ of the lens using Eq. 10.

In many embodiments, the end-to-end model can be trained using an optimizer, batch size, and learning rate (e.g., the Adam optimizer with a batch size of 22 and an initial learning rate of $2\times10^{-5}$). In certain embodiments, an exponential learning rate decay can be applied with a particular decay factor (e.g., decay factor of 0.666) that is triggered after a certain number of training steps (e.g., 15K, 20K, 25K, 28K, and 35K training steps). In certain embodiments, the network can be trained for a number of steps (e.g., trained the network for 50K steps (gradient updates) as appropriate to the requirements of specific applications in accordance with embodiments of the invention.

Different Formulations for Privacy-Preserving Loss $L_P$.

Certain embodiments of the system can define a privacy-preserving loss Lp as:

$$L_{P_1} = -\beta_3\left(\sum_{\tau=1}^{\Gamma_1} F_\tau(\mathcal{V}_F) - \sum_{\tau=\Gamma_1+1}^{\Gamma_1+\Gamma_2} F_\tau(\mathcal{S}_F)\right) - \beta_2 L_E \tag{16}$$

$$L_{P_2} = -\sum_{\tau=1}^{\Gamma_1} F_\tau(\mathcal{V}_F) - \sum_{\tau=\Gamma_1+1}^{\Gamma_1+\Gamma_2} F_\tau(\mathcal{S}_F) - \beta_4 L_F, \tag{17}$$

where $\beta_3 > 1$, $$2pt2ptL_F = \mathrm{Sim}_{cos}(a_f(x), a_f(y)), \tag{18}$$

$\mathrm{im}_{cos}$ denotes the cosine similarity, and $a_f(\bullet)$ stand for the model (e.g., ArcFace model). To compute $L_F$, certain embodiments can use a pretrained model (e.g., ArcFace model) on faces extracted from an input image x and distorted image y.

Compute $L_F$ in Eq. 18

Certain embodiments can use one or more different loss functions. Two additional loss function approaches in accordance with certain embodiments of the invention include: $L_{P_1}$ and $L_{P_2}$, shown in Eq. 16 and Eq. 17. In particular, for $L_{P_2}$ certain embodiments can compute $L_F$ loss in Eq. 18, which can measure face similarity/dissimilarity between original or input image x and "private" image y. To extract the face regions from the images, certain embodiments can use an available detector (e.g., the RetinaFace detector) with a particular backbone (e.g., ResNet50 backbone). Certain embodiments of the system can generate multiple files including face labels for a particular dataset (e.g., COCO 2017 dataset) for the training, validation, and testing sets, respectively. A file can include lines with the image filename and coordinates $(x_1, y_1)$, $(x_2, y_2)$ specifying the upper-left and lower-right corners of the face rectangle. In certain embodiments, coordinates can be presented as floating-point numbers in the range [0, 1] relative to the specific image's width and height. Then, with these face region annotations, faces can be cropped from both x and y and extract the embeddings using a model (e.g., ArcFace model) with pretrained weights loaded. The $L_F$ can be obtained by comparing both embedding vectors using the cosine similarity. Although particular loss functions are described that can measure face similarity/dissimilarity, any of a variety of loss functions can be utilized including for other privacy-preserving attributes as appropriate to the requirements of specific applications in accordance with embodiments of the invention.

Lightweight OpenPose

In many embodiments of the system, different human pose estimation (HPE) networks can be adopted as the CNN-decoder. Certain embodiments of the system can use a single branch for PAF and keypoints predictions instead of the two branches of OPPS; and replacing expensive convolutions (e.g., 7×7 convolutions) with less expensive processing (e.g., 3×3, 1×1, and 3×3 with dilation of 2 convolutions blocks). In certain embodiments, The backbone (e.g., VGG-19 backbone) network of OPPS can be replaced with other networks (e.g., MobileNet family networks). The other networks (e.g., MobileNets) can be built primarily from depthwise separable convolutions to reduce the computation in the first few layers. Certain embodiments can use the well-known ResNet-50 network as a replacement for the VGG-19 backbone.

Training Details

Certain embodiments of the system may assume an aberration-free freeform lens and use pretrained weights of a particular implementation (e.g., Tensorflow implementation of LOPPS) as a starting point. In certain embodiments, ince initializing the network with the previously learned weights, the single branch of LOPPS can be frozen and the first 68 trainable layers of the Resnet backbone fine-tuned to learn to extract human body features from the privacy image.

Certain embodiments of the system can simulate a sensor with a particular pixel size (e.g, pixel size of 3.40 μm) and a particular resolution (e.g., resolution of 864×864 pixels). Certain embodiments of the system can consider various coefficients (e.g., the first q=350 Zernike coefficients in Noll notation) to shape the surface profile φ. In certain embodiments, a defocus coefficient (e.g., fourth Zernike coefficient) can be initialized, such that the lens has a particular focal length (e.g., focal length of f=25 mm). In many embodiments, the optical element can be discretized with a particular feature size (e.g., 3.40 μm feature size) on an particular grid (e.g., 864×864 grid). In many embodiments, the system can be trained using a particular optimizer with a particular batch size (e.g., batch size of 24) and a particular initial learning rate (e.g., initial learning rate of $4\times10^{-5}$). Certain embodiments can apply an exponential learning rate decay with a particular decay factor (e.g., decay factor of 0.666) that is triggered after certain training steps (e.g., 15K, 20K, 25K, and 28K training steps). Certain embodiments of the system can train the network for a particular number of steps (e.g., 50K steps (gradient updates)).

Figure 4:
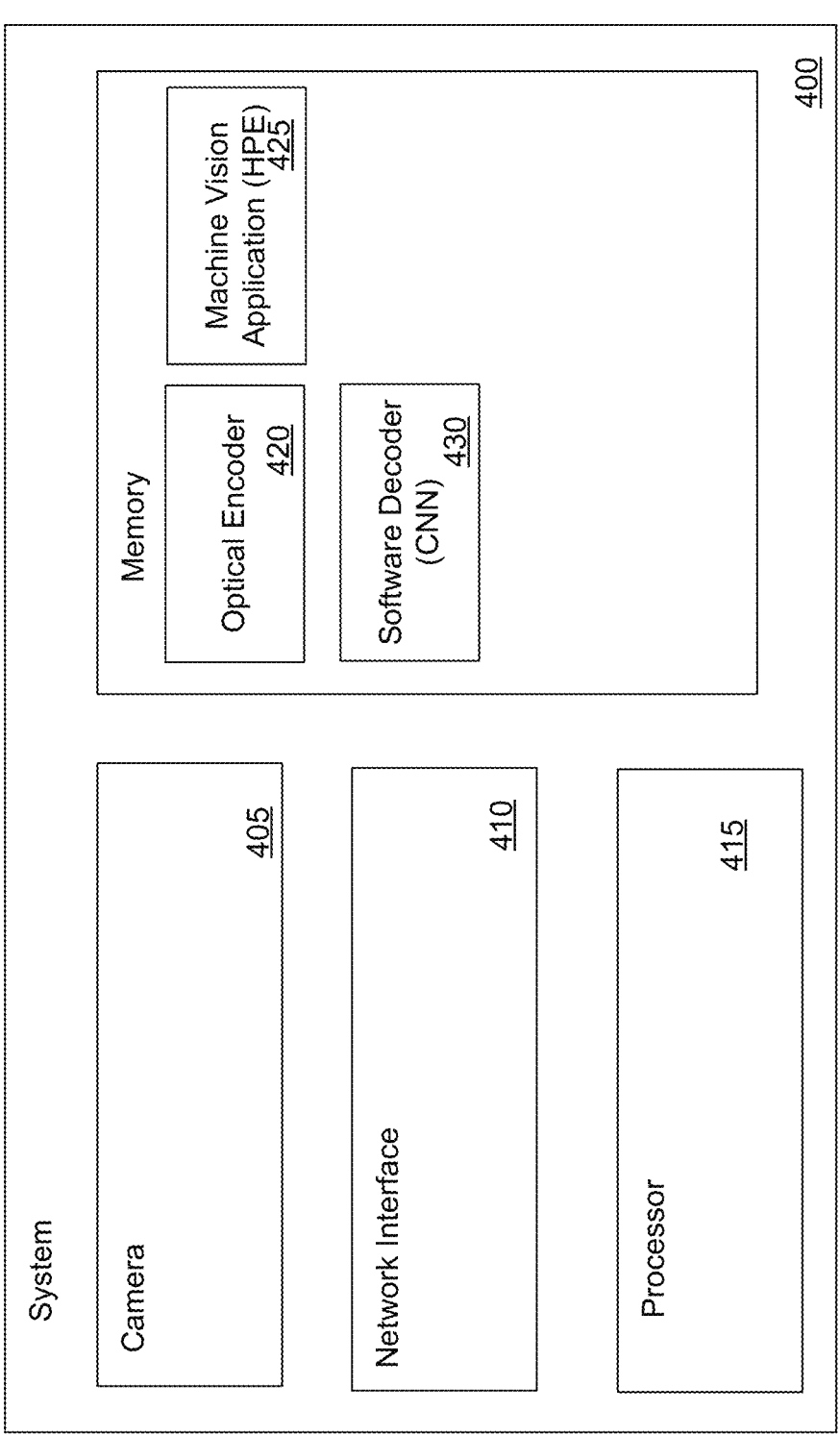
FIG. 4 illustrates a block diagram of a privacy-preserving system for machine vision in accordance with an embodiment of the invention.

A privacy-preserving system for machine vision in accordance with an embodiment of the invention is illustrated in FIG. 4. The system 400 can include one or more cameras 405 that capture images of a surrounding environment, a network interface 410 that communicates with an external device, a processor, and memory storing one or more different applications. The applications can include an optical encoder 420, one or more machine vision applications 425 such as human pose estimation (HPE) application, and a software decoder 425 such as a Convolutional Neural Network. In many embodiments, the optical encoder 420 is parametrized for a particular camera lens of the camera 405 in order to generate visually degraded images that protect privacy with respect to one or more attributes (e.g., face, age, race, gender, among others). For example, the optical encoder 420 can acquire images and produce images that obscure the identity of a person but still preserve important features for pose estimation.

The software decoder 425 can perform one or more different machine vision tasks, such as human pose estimation on optically degraded images provided by the optical encoder 420. Although FIG. 4 illustrates a particular privacy-preserving system for generating visually degraded images and performing machine vision on them, any of a variety of architectures can be utilized as appropriate to the requirements of specific applications in accordance with embodiments of the invention.

Although specific systems and methods for privacy-preserving optics are discussed above with respect to FIGS. 1-4, many different systems and methods can be implemented for a variety of different machine vision tasks in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents. Additional disclosure can be found in the appendices below.

What is claimed is:

1. A system, comprising:
a camera comprising an encoding optical element and at least one lens;
at least one processor; and
memory comprising an image processing pipeline application;
wherein the image processing pipeline application directs the at least one processor to:
generate an optimal set of parameters to parametrize the encoding optical element in the camera to produce optical distortions such that acquired images by the camera are distorted, wherein the optimal set of parameters is learned via end-to-end learning that jointly optimizes from a camera optics model to a computational process that performs a computer vision task on distorted images acquired by the camera, wherein the distorted images visually obscure a privacy attribute of people to protect their privacy but still preserve features to perform the computer vision task;
acquire a plurality of distorted images using the camera; and
perform the computer vision task directly on the plurality of distorted images, wherein the distortions generated by the camera are optimal and allow obtaining high performance on the computer vision task.

2. The system of claim 1, wherein the image processing pipeline application comprises a deep neural network (DNN), wherein the DNN is trained to detect a plurality of features directly on the distorted images, and wherein the DNN comprises a plurality of layers for detecting the plurality of features based on a plurality of nodes that perform a calculation on degraded input image data.

3. The system of claim 1, wherein the encoding optical element comprises an ensemble of optical elements that generate image distortion via light modulation.

4. The system of claim 3, wherein the distortion produced by the encoding optical element is optimal for a specific computer vision task and allows obtaining high performance.

5. The system of claim 1, where functionality of the camera, including the encoding optical element, is emulated in software to generate synthetic degraded images.

6. The system of claim 5, where the camera is coupled with the image processing pipeline application to emulate the system.

7. The system of claim 1, where the set of parameters for the encoding optical element add optical aberrations to the camera lens.

8. The system of claim 1, wherein the distorted images obscure at least one privacy-preserving human attribute selected from a group consisting of, for example, facial features, gender, race, and age.

9. The system of claim 1, wherein the distorted images are robust to blind and non-blind deconvolution attacks.

10. The system of claim 1, wherein performing a computer vision task comprises performing human pose estimation (HPE) on the distorted images.

11. The system of claim 1, wherein the image processing pipeline application comprises a computer vision decoder that has been jointly trained to generate the set of parameters of the camera encoding optical element $\alpha^*$ and a convolutional neural network fo human r pose estimation h* such that:

$$\alpha^*, h^* = \mathrm{argmin}_{\alpha,h} L_T(h) + L_P(\alpha).$$

where $L_T$ is a loss function for the human pose estimation task, and $L_P$ is a loss function that encourages privacy-preservation.

12. The system of claim 11, wherein the set of parameters of the camera encoding optical element comprises a lens surface profile $\phi$, in terms of Zernike coefficients $\alpha$, and a corresponding point spread function (PSF) H for the camera lens.

13. The system of claim 12, wherein the set of parameters parametrize a lens surface profile $\phi$ with the Zernike basis, such that:

$$\phi = \sum_{j=1}^{q} \alpha_j Z_j,$$

where $Z_j$ is the j-th Zernike polynomial in Noll notation, and $\alpha_j$ is the corresponding coefficient, wherein each Zernike polynomial describes a wavefront aberration such that the surface profile $\phi$ is formed by a linear combination of all aberrations.

14. The system of claim 11, wherein the computer vision decoder is a convolutional neural network (CNN) decoder that is trained using a backbone network and a plurality of branches of convolutional layers, wherein the backbone network extracts features from an image of size w×h, which are then fed into the plurality of branches convolutional layers, wherein a first branch predicts a set of confidence maps, where each map represents a specific body part location, and a second branch predicts a set of Part Affinity Fields (PAFs), where each field represents the degree of association between parts.

15. The system of claim 11, wherein:

the optical encoder and the computer vision decoder share a loss function; and the optical encoder and computer vision decoder are configured to jointly optimize the privacy-preserving optical system and a computer vision model.

16. A method of preserving-privacy on captured images while performing a computer vision task, comprising:

generating an optimal set of parameters to parameterize an encoding optical element of a camera to produce optical distortions such that acquired images by the camera are distorted, wherein the optimal set of parameters is learned via end-to-end learning that jointly optimizes from a camera optics model to a computational process that performs a computer vision task on distorted images acquired by the camera, wherein the distorted images visually obscure a privacy attribute of people to protect their privacy but still preserve features to perform the computer vision task;

acquiring a plurality of distorted images using the camera; and performing a computer vision task directly on the plurality of distorted images wherein the distortions generated by the camera are optimal and allow obtaining high performance on the computer vision task.

17. The method of claim 16, further comprising using a deep neural network (DNN), wherein the DNN is trained to detect a plurality of features directly on the distorted images, and wherein the DNN comprises a plurality of layers for detecting the plurality of features based on a plurality of nodes that perform a calculation on degraded input image data.

18. The method of claim 16, wherein the encoding optical element comprises an ensemble of optical elements that generate image distortion via light modulation.

19. The method of claim 18, wherein the distortion produced by the encoding optical element is optimal for a specific computer vision task and allows obtaining high performance.

20. The method of claim 16, wherein the computer vision task is a human pose estimation (HPE) task on the distorted images.

*   *   *   *   *